(12) United States Patent
Bayer et al.

(10) Patent No.: US 6,226,193 B1
(45) Date of Patent: May 1, 2001

(54) DC/DC CONVERTER

(75) Inventors: Erich Bayer, Thonhausen; Christian Meindl, Freising; Hans Schmeller, Falkenberg, all of (DE)

(73) Assignee: Texas Instruments Deutschland, GmbH, Freising (DE)

( * ) Notice: Subject to any disclaimer, the term of this patent is extended or adjusted under 35 U.S.C. 154(b) by 0 days.

(21) Appl. No.: 09/625,901

(22) Filed: Jul. 26, 2000

(30) Foreign Application Priority Data

Jul. 27, 1999 (DE) ............................................. 199 35 249

(51) Int. Cl.[7] ...................................................... H02M 3/07
(52) U.S. Cl. ................................................. 363/59; 363/60
(58) Field of Search ........................ 363/59, 60; 307/109, 307/110; 327/536, 537, 535

(56) References Cited

U.S. PATENT DOCUMENTS

| | | | |
|---|---|---|---|
| 5,493,486 | * 2/1996 | Connell et al. | 363/60 |
| 5,561,597 | * 10/1996 | Limpaecher | 363/59 |
| 5,744,878 | * 4/1998 | Wachter et al. | 307/130 |
| 5,994,949 | * 11/1999 | Menichelli | 327/536 |
| 6,046,625 | * 4/2000 | Menichelli | 327/536 |
| 6,051,984 | * 4/2000 | Huang et al. | 324/765 |

* cited by examiner

Primary Examiner—Adolf Deneke Berhane
(74) Attorney, Agent, or Firm—Bret J. Petersen; Frederick J. Telecky, Jr.

(57) ABSTRACT

The invention relates to a DC/DC converter operating on the charge pump principle, regulated to a fixed, predetermined output voltage and comprising two charge pump capacitors switched in a switch matrix consisting of nine switches. A control circuit is provided capable of controlling the switches so that the charge pump is changed over between a charging phase and a discharge phase and which is capable of operating the charge pump in two modes having different voltage gain factors (1.5; 2). The regulator comprises furthermore a regulator circuit capable of setting when the charge pump is active in the charging phase in the first mode the ON resistance of a switch present in the charge path of the charge pump capacitors or in the second mode the ON resistances of two switches present each in one of the charging paths of the first or second charge pump capacitor so that the charging voltage presented to the charge pump capacitors in the charging phase assumes the minimum value possible for a specific input voltage of the converter, a measuring circuit capable of defining the voltage occurring at one of the charge pump capacitors at a defined point in time of the charging phase; and a comparator capable of comparing the measured voltage to a predetermined voltage and then when the former attains the latter, changing over the charge pump into the corresponding other mode, wherein the predetermined voltage is selected so that the efficiency of the converter is optimized and the charging condition of the charge pump capacitors is not altered on changeover.

11 Claims, 3 Drawing Sheets

DC/DC CONVERTER

The invention relates to a DC/DC converter operating on the charge pump principle, receiving an input voltage and regulating it into a fixed, predetermined output voltage.

Many electronic circuits require in addition to the supply voltage further voltages sometimes at a level above that of the supply voltage. One low-cost, simple and with respect to converters employing a coil highly compact solution for making these further voltages available are DC/DC converters operating on the charge pump principle. Converters of this kind are described e.g. in the text book "The Art of Electronics" by Paul Horowitz, 2nd edition, Cambridge University Press, New York, 1991 on pages 377 to 379 thereof.

Horowitz also describes a simple DC/DC converter operating on the charge pump principle which may be employed to attain an output voltage corresponding, at the most, to roughly twice the input voltage. The basic circuit of the converter consists substantially of a charge pump capacitor and four controllable switches (e.g. MOSFETs), whereby one electrode of the charge pump capacitor is connectable via the first switch to the input voltage terminal of the converter and via the second switch to ground, and the other electrode of the capacitor is connectable via the third switch to the input voltage terminal and via the fourth switch to the output voltage terminal of the converter. The converter comprises further a control circuit including a clock oscillator which signals the switches so that in a first phase of a clock cycle, the so-called charge phase, the second switch and the third switch are ON whilst the other switches are OFF so that the charge pump capacitor is charged to the input voltage, and in a second phase of a clock cycle, the so-called discharge phase, the first switch and the fourth switch are ON whilst the other switches are OFF so that the charged charge pump capacitor is then connected in series to the input voltage, resulting in a voltage value at a smoothing and storage capacitor located at the output of the circuit corresponding to roughly twice the input voltage.

In the DC/DC converter described, operating in accordance with the charge pump principle, the output voltage undesirably drops off sharply at even small load currents, however. Since in the majority of applications the output voltage, which e.g. in digital electronic circuits is often 3.3 or 5 V, is fixed and is allowed to fluctuate only in a tight range, regulated converters have been developed which set the output voltage to a fixed, desired voltage value.

The regulators of the DC/DC converters comprise as a rule a comparator which compares the actual output voltage or a voltage proportional to the actual output voltage (the proportional voltage being derived e.g. from the output voltage via a voltage divider) to a predetermined reference voltage representing the design output voltage and then, when a deviation is sensed, outputs a control signal, with the aid of which the actual output voltage is adapted to the predetermined design output voltage value.

Described in U.S. Pat. No. 5,680,300 are two types of regulators employed in DC/DC converters operating on the charge pump principle, i.e. the so-called linear regulator and the so-called skip mode regulator.

In the linear regulator the control signal of the comparator changes, e.g. via a gate of one of the MOSFET switches, the ON resistance of the MOSFET so that the drop in voltage across the switch is increased or decreased, resulting in a reduction or increase in the actual output voltage. The linear regulator has, however, the drawback that the losses occurring on switching the charge pump switches are relatively large since the charge pump in the case of the linear regulator is always in operation; it thus being suitable only for relatively large load currents occurring continually.

These drawbacks do not occur in the so-called skip mode regulator since it uses the control signal of the comparator to signal the charge pump alternatingly ON/OFF so that a charge is pumped to a smoothing and storage capacitor located at the output of the circuit only when the voltage connected thereto has dropped below the design output voltage level. The skip mode regulator thus operates in a particularly energy-saving way and is especially suitable for applications in which sometimes small and sometimes large load currents may occur.

One drawback in the described DC/DC converters regulated to a fixed predetermined output voltage operating in accordance with the charge pump principle, however, is that their efficiency is not an optimum over the full input voltage range when changes in the input voltage occur in time, as is typical e.g. in the case of battery-operated devices.

To get round this problem German patent application No. 199 24 047.7 proposed a DC/DC converter comprising, in addition to the circuit array of four switches and a charge pump capacitor employed in the Horowitz converter as described above, a second circuit array configured and switched the same as the first circuit array. In this arrangement a further controllable switch is also provided, via which the two charge pump capacitors of the two circuit arrays may be interconnected. For optimizing the efficiency of the converter in the case of a changing input voltage the control circuit in this arrangement is able to operate the charge pump e.g. in two different modes, i.e. in a first mode in which the charge pump works with a gain factor of 1.5 and in a second mode in which the charge pump works with a gain factor of 2. When the voltage—supplied for instance by a battery—applied to the input of the converter has dropped to a critical value, a changeover is made from the first mode to the second mode. In the first mode the two charge pump capacitors in this arrangement are connected in series between the input of the converter and ground via the switches in the charging phase of the charge pump, whilst in the second mode they are connected in parallel between the input and ground. In the discharge phase of the two modes the two charge pump capacitors are connected in parallel between the input and output of the converter.

In the patent application describing this converter with improved efficiency it is proposed to select the mode by measuring the input voltage and selecting the mode suitable for optimal efficiency as a function of the input voltage.

The disadvantage of this simple solution is that the value of the input voltage is only then independent of the load current of the converter when the ON resistance of the switches of the charge pump is infinitely small. In addition to this, spikes occur in the output current and in the output voltage on changeover between the modes.

In a similar converter of the Company National Semiconductor type LM 3352 described in a product catalog available in June 1999 in Internet under the site address http://www.national.com the value of the output voltage of the converter is additionally made use of to select the suitable gain mode of the converter. However, this approach for selecting the suitable mode has various drawbacks. Thus, the output voltage is not independent of the gain mode. In the described converter the gain mode changes with increasing input voltage and the output voltage drops off. However, the particularly serious disadvantage in this arrangement is that the output voltage also spikes in this case when a change is made from one gain mode to the other. This simultaneously involves a large current spike at the output of the converter system causing heavy electromagnetic interference. This is particularly a nuisance in items of equipment incorporating such charge pump converters as employed in telecommunications applications, e.g. in mobile telephones.

It is thus the object of the present invention to configure a DC/DC converter operating on the charge pump principle, regulated and comprising various gains modes so that the changeover between the modes is improved in avoiding current spikes and voltage overshoots at the output of the DC/DC converter as observed in existing DC/DC converters of this kind.

This object is achieved for a DC/DC converter operating on the charge pump principle and regulated to a predetermined output voltage, including a first circuit array comprising a first charge pump capacitor, the one electrode of which is connectable via a first switch to the input of the converter and via a second switch to the ground and the other electrode of which is connectable via a third switch to the input of the converter and via a fourth switch to the output of the converter;

a second circuit array configured the same as the first circuit array, in which the one electrode of its capacitor is connectable to the other electrode of the capacitor of the first circuit array via a further switch, all switches being controllable switches;

a control circuit capable of controlling the switches so that the charge pump is changed over between a charging phase and a discharge phase, and which is capable of operating the charge pump in two modes, whereby in the charging phase in the first mode the third switch of the second circuit array, the second switch of said first circuit array and the further switch and in the second mode each of the second and third switches of the two circuit arrays are ON, and in the discharge phase of the two modes the first and fourth switch each of the two circuit arrays is ON, whilst each other switch not mentioned is OFF;

a regulator circuit capable of setting when the charge pump is active in the charging phase in the first mode the ON resistance of a switch present in the charge path of the charge pump capacitors or in the second mode the ON resistances of two switches present each in one of the charging paths of the first or second charge pump capacitor so that the charging voltage presented to the charge pump capacitors in the charging phase assumes the minimum value possible for a specific input voltage of the converter;

a measuring circuit capable of determining the voltage occurring at one of the charge pump capacitors at a defined point in time of the charging phase; and a comparator capable of comparing the measured voltage to a predetermined voltage and then when the former attains the latter, changing over the charge pump into the corresponding other mode;

wherein the predetermined voltage is selected so that the efficiency of the converter is optimized and the charging condition of the charge pump capacitors is not altered on changeover.

Advantageous further embodiments of the invention are characterized in the sub-claims.

The invention will now be explained by way of example with reference to the drawings in which FIG. 1 is a switch matrix of the charge pump and charge pump capacitors as used in the DC/DC converter in accordance with the invention;

FIGS. 2a–c are each a switch matrix illustrating the various switch positions of the switches as shown in FIG. 1 in the charging phase and discharge phase of the two modes of the converter;

FIG. 3 a circuit diagram of a first embodiment of the DC/DC converter in accordance with the invention making use of a linear regulator for regulating the voltage at the output of the converter;

Figure 1:
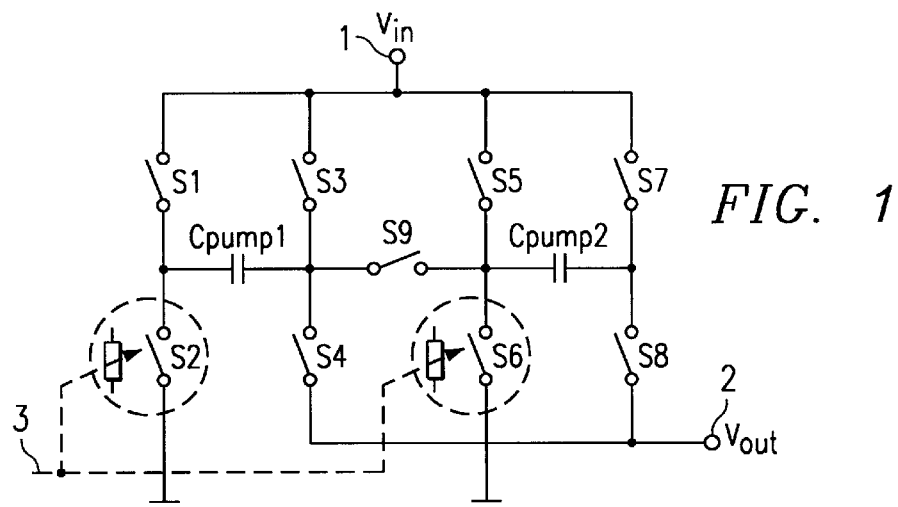

Referring now to FIG. 1 there is illustrated the circuit array of one charge pump capacitor Cpump1 and four controllable switches S1, S2, S3 and S4 in the DC/DC converter in accordance with the invention. The one electrode of the capacitor C1 is connectable via the first switch S1 to the input 1 of the converter to which a DC voltage Vin is applied as furnished e.g. by one or more battery cells and via the second switch S2 to ground. The other electrode of the charge pump capacitor Cpump1 is connectable via the third switch S3 to the input 1 of the converter and via the fourth switch S4 to the output 2 of the converter at which the output voltage Vout is available.

In addition the converter includes a second circuit array configured the same as the first circuit array and comprising a second charge pump capacitor Cpump2 as well as four controllable switches S5, S6, S7 and S8. In this arrangement, the same as in the first circuit array, the one electrode of the charge pump capacitor Cpump2 is connectable via the first switch S5 of the second circuit array to the input 1 of the converter and via the second switch S6 of the second circuit array to ground whilst the other electrode of the second charge pump capacitor Cpump2 is connectable via the third switch S7 of the second circuit array to the input 1 of the converter and via the fourth switch S8 of the second circuit array to the output 2 of the converter.

The one electrode of the charge pump capacitor Cpump1 of the first circuit array is connectable via the further controllable switch S9 to the other electrode of the charge pump capacitor Cpump2 of the second circuit array.

All controllable switches of the DC/DC converter preferably fabricated integrated are preferably MOSFETs.

Two of the switches, namely switches S2 and S6 are set to permit variable adjustment of their ON resistance which can be achieved e.g. by MOSFETs in which the supply voltage applied to their gate drivers is adjustable. In this arrangement the ON resistances of the switches S2 and S6 are set in parallel by a control signal 3, the function of which is detailled below.

Provided at the output of the converter is—as usual in such converters—a storage capacitor (likewise not shown).

The DC/DC converter comprises furthermore a control circuit (not shown in FIG. 1) controlling all switches S1–S9. The control circuit includes an oscillator whose clock signal causes the switches to changeover between a charging phase and a discharge phase, both of which are described below.

Figure 2A:
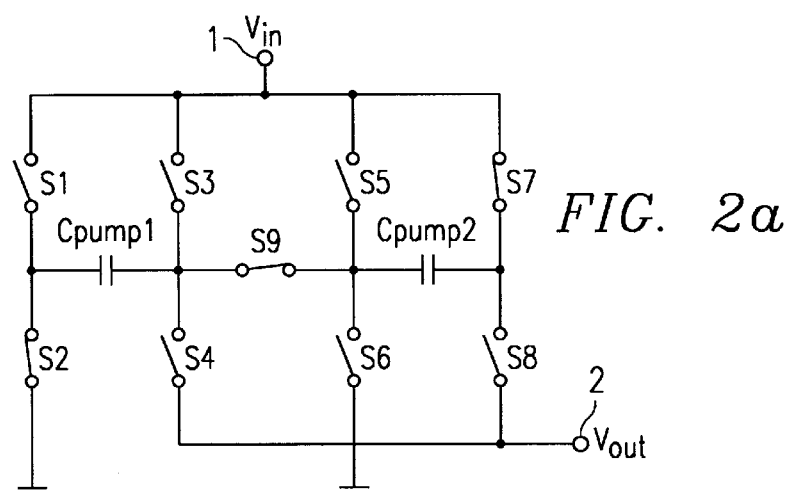
Figure 2B:
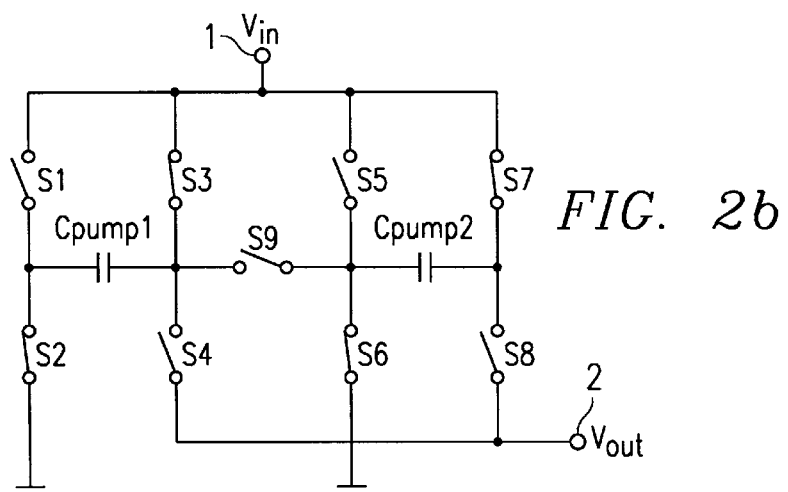
Figure 2C:
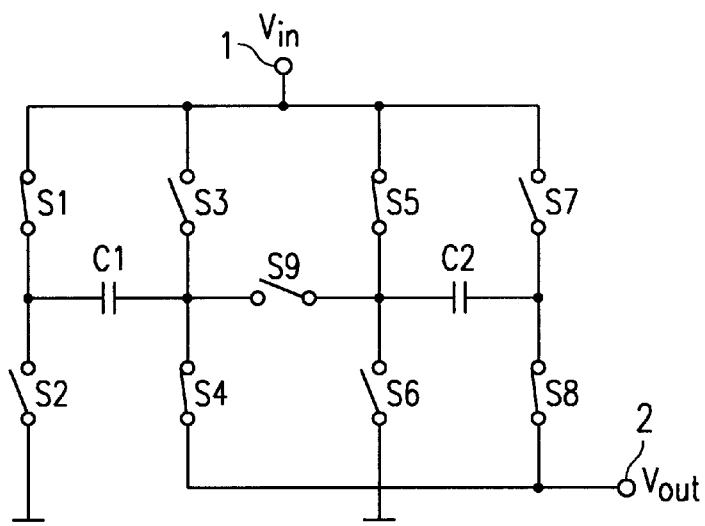

By suitable selecting the switch positions of the controllable switches S1–S9 the control circuit is capable of switching the charge pump capacitors Cpump1 and Cpump2 into three different capacitor circuit arrangements as shown in FIGS. 2a to 2c. Due to the different assignments of the corresponding capacitor circuit arrangements to the charging phase and discharge phase two different operating modes of the DC/DC converter materialize, i.e. a first mode having a maximum voltage gain factor of 1.5 and a second mode having a maximum voltage gain factor of 2. Both modes will now be explained.

In the first capacitor circuit arrangement as shown in FIG. 2a the charge pump capacitors Cpump1 and Cpump2 are connected in series between the input 1 of the DC/DC converter and ground. In this arrangement the second switch S2 of the first circuit array, the third switch S7 of the second circuit array and the further switch S9 are ON whilst the remaining switches are OFF.

In the second capacitor circuit arrangement as shown in FIG. 2b the charge pump capacitors Cpump1 and Cpump2 are connected in parallel between the first terminal of the converter and ground. In this arrangement the second switch S2 and the third switch S7 of the first circuit array are ON whilst the remaining switches are OFF.

In the third capacitor circuit arrangement as shown in FIG. 2c the charge pump capacitors Cpump1 and Cpump2 are connected in parallel between the input 1 and output 2 of the converter. In this arrangement the first switch S1 and fourth switch S4 of the first circuit array and the first switch S5 and the fourth switch S8 of the second circuit array are ON whilst the remaining switches are OFF.

In the first mode of the converter the first arrangement as shown in FIG. 2a is selected in the charging phase, whilst in the discharge phase a changeover is made to the third arrangement as shown in FIG. 2c. This results in each of the charge pump capacitors in the charging phase being charged to max Vin/2. Due to—in the discharge phase—the parallel circuit of the two charge pump capacitors Cpump1 and Cpump2 being connected in series to the input voltage a gain in the input voltage is achievable by maximally the factor 1.5 in the first mode at the output 2 of the converter.

In the second mode of the converter the second arrangement as shown in FIG. 2b is selected in the charging phase, whilst in the discharge phase a changeover is made—the same as in the first mode—to the third arrangement as shown in FIG. 2c. This results in each of the charge pump capacitors in the charging phase being charged to max Vin. Due to—in the discharge phase—the parallel circuit of the two charge pump capacitors Cpump1 and Cpump2 being connected in series to the input voltage a gain in the input voltage is achievable by maximally the factor 2 in the second mode at the output 2 of the converter.

It is now required that the converter in accordance with the invention shall always select the corresponding mode so that the efficiency η of the converter is always set to an optimum. In this respect the following equation is to be observed equating the efficiency of a DC/DC converter operating according to the charge pump principle and regulated to a predetermined output voltage Vout:

$$\eta = Vout/(Vin*F) \quad (1)$$

where F is the gain factor of the circuit. For the charge pump to function properly due regard must be given to the mandatory requirement $$Vin > (1/F)*Vout \quad (2).$$

If e.g. a regulated voltage of 3.3 Volt is to be generated at the output of the converter and should the voltage furnished at the input of the converter by one or more batteries drop during the life thereof from 2.5 to 1.8 Volt then optimum efficiency of the converter is achieved over the full battery output life in accordance with the equations (1) and (2) when the converter is operated between 2.5 and 2.2 Volt in the 1.5 mode and between 2.2 and 1.8 Volt in the 2 mode. How the efficiency of such a converter is optimized is detailed in the aforementioned patent application No. 19924047.7.

Figure 3:
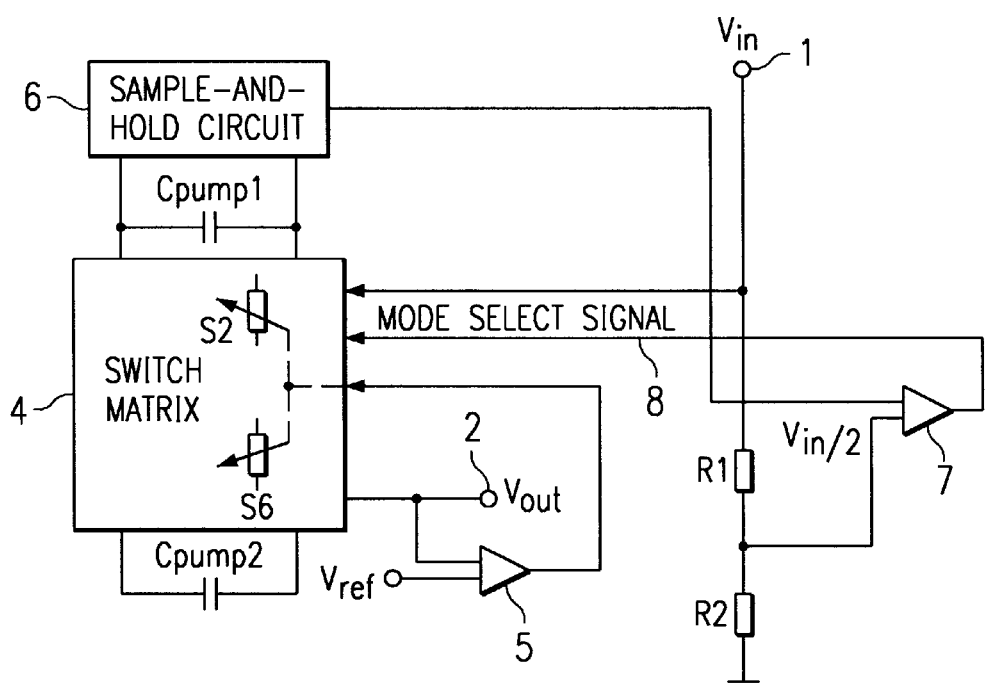

In the DC/DC converter in accordance with the invention as shown in FIG. 3 the changeover between the two modes is now configured so that during changeover no current or voltage spikes appear at the input or output of the converter as is detailed below.

The switch matrix 4 of the DC/DC converter in accordance with the invention as shown in FIG. 1 is illustrated merely schematically in FIG. 3 in which only the two charge pump capacitors Cpump1 and Cpump2 are indicated.

The DC/DC converter as shown in FIG. 3 is a linear regulated converter. In this arrangement the regulator circuit is formed by a first comparator 5 receiving at one input the actual output voltage Vout of the converter and a reference voltage Vref at its other input, this reference voltage representing the design output voltage of the converter. The first comparator 5 compares the actual output voltage Vout to the reference voltage Vref and outputs a control signal which sets in the first mode the ON resistance of the second switch S2 of the first circuit array and in the second mode the ON resistances of the second switch S2 of the first circuit array and of the second switch 56 of the second circuit array so that the voltages appearing across the charge pump capacitors Cpump1 and Cpump2 during the charging phase assume as a function of the input voltage the minimum possible voltage in each case and the voltage at the output 2 of the converter is regulated to the desired design value. The higher the input voltage of the converter in any one mode, the longer is the time constant R*C of the corresponding charge pump capacitor in the charging phase so that the charging characteristic of the capacitor is flattened. The smaller the input voltage of the converter in any one mode the lower the setting of the ON resistance in this case. Due to the linear regulation the time constant of the charging curve is longer than the (non-regulated) time constant of the discharge curve of the charge pump capacitor(s).

The DC/DC converter in accordance with the invention comprises furthermore a measuring circuit capable of determining at a specific point in time of the charging phase the voltage Vcpump1 appearing across the charge pump capacitor Cpump1. In the example embodiment as shown in FIG. 3 the measuring circuit is formed by a sample-and-hold circuit 6 which samples the voltage applied to the charge pump capacitor during the charging phase (of mode 1 or 2) and holds it at the end of the charging phase. In this arrangement the sample-and-hold circuit may also be controlled by the clock of the aforementioned control circuit of the DC/DC converter.

The output of the sample-and-hold circuit 6 is connected to the first input of a second comparator 7 the so-called mode selection comparator. Connected to the second input of the second comparator 7 is a predetermined voltage which in the selected example embodiment amounts to Vin/2 and is derived from the input voltage by the voltage divider formed by equal resistors R1 and R2.

The predetermined voltage in this arrangement is selected so that the efficiency of the converter is optimized and the charging condition of the charge pump capacitors is not altered on changeover between the two modes of the converter as is explained below.

The comparator outputs a control signal 8, a so-called mode select signal to the control circuit of the converter when the voltage measured by the sample-and-hold circuit 6 across the charge pump capacitor Cpump1 attains the value Vin/2 in any mode, the control circuit then changing the converter over to the other mode in each case.

Figure 4:
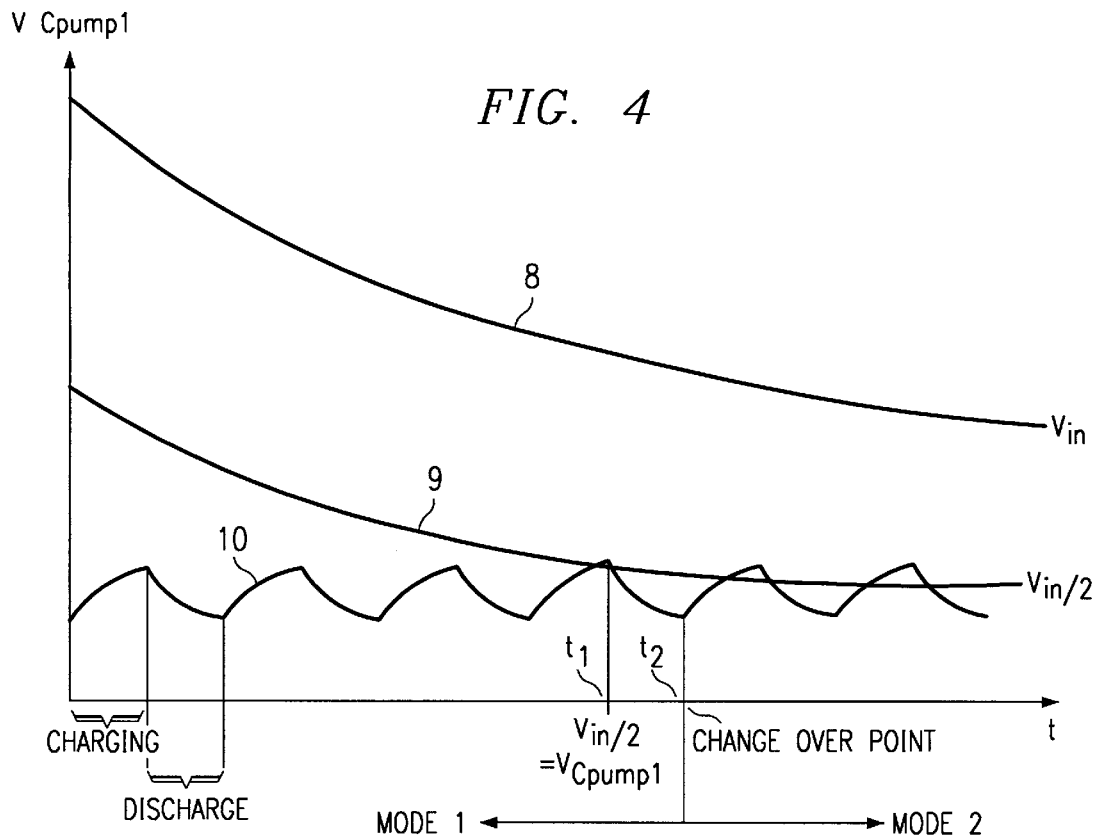
FIG. 4 is a graph plotting the voltage occurring across one of the charge pump capacitors of the converter as shown in FIG. 3 as compared to the input voltage and half the input voltage in demonstrating the changeover of the converter.

Referring now to FIG. 4 the changeover procedure and how the predetermined voltage value is selected will now be detailed. Illustrated in FIG. 4 is the typical profile of a convertor input voltage 8 varying with time as may be furnished by a battery. A second curve 9 illustrates the corresponding value of half the input voltage Vin/2 corresponding to the predetermined comparison voltage of the mode selection comparator 7. The curve 10 shows by way of an example how the voltage Vcpump1 across the first charge pump capacitor Cpump1 could vary, this clearly indicating the cyclic repetition of the typical charging and discharge curve components materializing from the charging or discharge phases of the charge pump, assuming that the load at the output of the converter is constant. To make for an uncluttered representation only a few charge pump cycles are illustrated in the curve 10, it being obvious to the person skilled in the art that in reality e.g. many millions of cycles may materialize e.g. during the discharge time period of a battery.

In the left-hand portion of the time axis, i.e. at the point in time t1 the charge pump is operated in the first mode 1, i.e. with the gain factor 1.5. In this case it is not necessary to charge the charge pump capacitors Cpump1 and Cpump2 in the charging phase to the maximum possible value of Vin/2 in the first mode since the input voltage is greater than Vout/1.5. It will be remembered as described above that the voltage across the charge pump capacitors is set by the regulator circuit 5 to the minimum possible value for a specific input voltage, i.e. a drop in the input voltage prompts the regulator circuit 5 to continually reduce the ON resistance of the switch S2 until the voltage across the charge pump capacitor Cpump1 as sensed by the sample-and-hold circuit 6 at the end of a charging phase attains the value Vin/2, this occurring as shown in FIG. 4 at the point in time t1. This value represents for the first mode with the gain factor 1.5 a limit value since the predetermined output voltage can no longer be attained when the input voltage drops further below this value. Thus, in this case the mode selection comparator 7 needs to make a changeover to the second mode with the gain factor 2. This changeover occurs in the selected example embodiment at the point in time t2 at the end of the cycle, i.e. after the discharge phase of the charge pump following sensing since the time duration of the discharge phase is needed for analyzing the results of sensing.

The reason why the predetermined voltage Vin/2 applied to the second input of the mode selection comparator 7 is favorable is that it causes no change in the charging condition of the charge pump capacitors Cpump1 and Cpump2 when a changeover is made from one mode to the other, thus eliminating current spikes and overshoots in the output voltage of the converter.

When, as is evident from FIG. 4 a changeover is made at the point in time t2 to the second mode with a gain factor 2 the regulator circuit 5 now sets the ON resistances of the switches S2 and S6 so high that the voltage across the charge pump capacitors Cpump1 and Cpump2 is Vin/2 in each case. Should the input voltage Vin continue to drop then the ON resistances are further diminished so that the voltage across the charge pump capacitors Cpump1 and Cpump2 approaches its maximum value Vin.

It will readily be appreciated that the advantages of the DC/DC converter in accordance with the invention materialize just the same for changeover from the second mode into the first mode analogous to the changeover procedure as described above.

Figure 5:
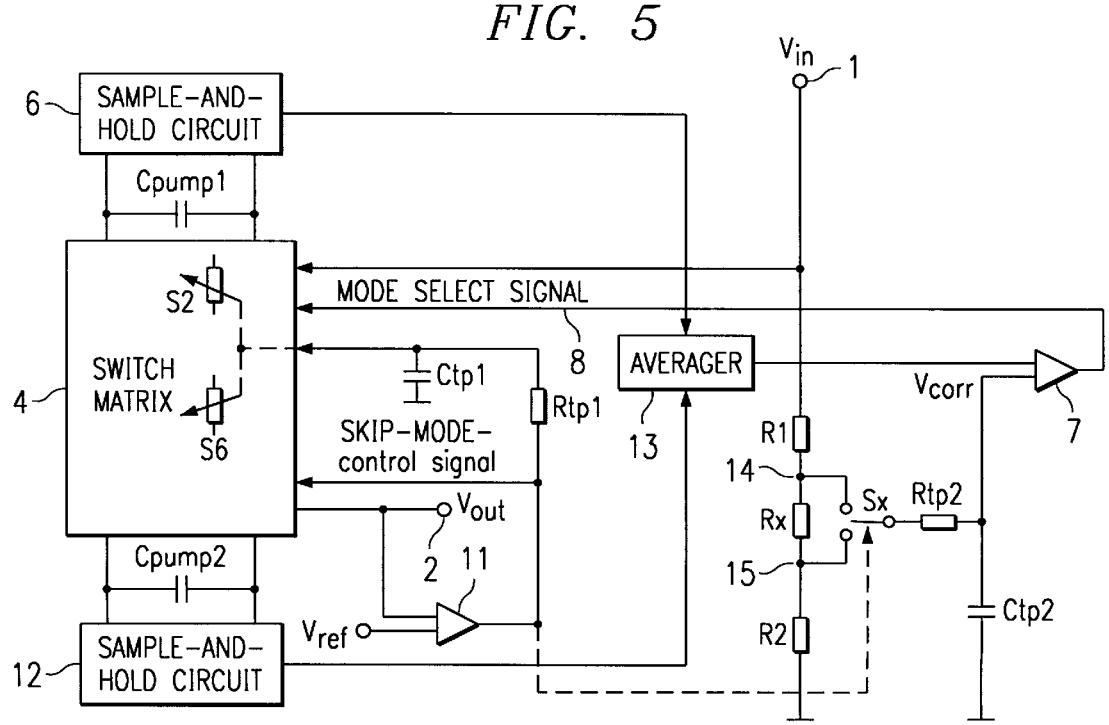
FIG. 5 is a circuit diagram of a second embodiment of the DC/DC converter in accordance with the invention making use of a skip-mode regulator for regulating the voltage at the output of the converter.

Referring now to FIG. 5 there is illustrated a further embodiment of the DC/DC converter in accordance with the invention. Instead of the regulator circuit 5 as shown in FIG. 3 this converter comprises a skip-mode regulator as described above in the background description which is formed by the comparator 11. The comparator 11 compares the actual output voltage Vout to a reference voltage Vref representing the design output voltage and outputs a control signal to the control circuit (not shown) of the converter when Vout drops below the design output voltage, resulting in the control circuit activating the charge pump. When the design output voltage is exceeded, the charge pump is correspondingly deactivated. In this arrangement a low-pass filter comprising a resistor Rtp1 and a capacitor Ctp1 is connected to the output of the skip-mode comparator 11 which generates a signal characterizing the momentary ratio of the ON duration to the OFF duration of the charge pump with which in the first mode the ON resistance of the switch S2 and in the second mode the ON resistances of the switches S2 and S6 are controlled so that the charging voltage across the charge pump capacitors in the charging phase assumes the minimum possible value as a function of the input voltage. What is involved is thus a skip-mode regulator having cascade linear control. A corresponding regulator also reads from German patent application 199 312 059.9. Skip-mode regulation has the advantage over the purely linear regulation as described above in conjunction with FIG. 3 that the charge pump is not continually in operation so that the switch losses can be considerably reduced which is particularly of importance in applications requiring normal operation only seldom, i.e. mostly running in the standby mode.

Since the two charge pump capacitors Cpump1 and Cpump2 are the sole components located outside of the circuit arrangement of the DC/DC converter in accordance with the invention configured otherwise integrated, it may be that they fail to precisely agree as regards their characteristic values. This is why in the embodiment of the converter in accordance with the invention as shown in FIG. 5 a second sample-and-hold circuit 12 is provided which senses the voltage across the second charge pump capacitor Cpump2 at the end of the charging phase in the way as described above. By means of an averager 13 an average value is formed from the voltage values output by the two sample-and-hold circuits 6 and 12 which is applied to one output of the mode selection comparator 7 as the predetermined comparison voltage.

The predetermined voltage value to be applied to the second input of the mode selection comparator 7 will only correspond precisely to Vin/2 when the losses in the switches are negligably small, this no longer being the case when the load at the output of the converter exceeds a critical measure. This is the reason why the predetermined voltage termed Vcorr (corrected voltage) in FIG. 5 is not a fixed value, but a value as a function of the load in this embodiment of the DC/DC converter in accordance with the invention. In this arrangement a measure for the load is the control signal derived from the skip-mode comparator 11. The greater the load, the greater is the proportion of a condition of this control signal representing the ON condition occurring in a specific time interval and the smaller is the proportion of the condition of this control signal representing the OFF condition.

A voltage divider formed by three resistors R1, Rx and R2 connected in series between the input voltage Vin of the converter and ground is provided, the correction resistance Rx being substantially smaller than the equal resistors R1 and R2. The voltage appearing at the connecting point 14 of R1 and Rx amounts to e.g. 1.1 Volt in this arrangement, whilst the voltage appearing at the connecting point 15 of Rx and R2 amounts to 1.0 Volt.

With the output signal of the skip-mode comparator 11 representing the momentary load condition of the converter a further controllable switch Sx is signalled (indicated by the broken line in FIG. 5) which selectively connects a low-pass filter connected to one terminal of the switch and comprising the resistor Rtp2 and the capacitor Ctp2 to the circuit point 14 or circuit point 15. In this arrangement the switch is connected to the circuit point 14 when the charge pump is activated and to the circuit point 15 when the charge pump is deactivated. This signalling of the switch Sx results in a corrected predetermined voltage Vcorr being generated by the low-pass filter Rtp2, Ctp2 at one input of the mode selection comparator 7, this voltage increasing for a reduction in the load current and decreasing on an increase in the load current. This results in a minor correction of the ideal changeover point Vin/2 for optimizing the efficiency of the converter as is described above in conjunction with FIG. 3, whereby the correction compensates the larger drop in voltage across the switches for increasing load currents. In actual practice this correction is of the order of 0.1*Vin/2.

The way in which the DC/DC converter as evident from FIG. 5 works is the same as that as described above in conjunction with the converter as shown in FIG. 3.

It is furthermore to be noticed that the control circuit may undertake the changeover between the modes also not before a certain number of changeover signals has been furnished by the mode selection comparator in sequence to thus render the converter even more reliable.

Furthermore, it is in principle irrelevant for the converter in accordance with the invention at which point in time in the charging phase of the converter the voltage is measured at one or both charge pump capacitors, i.e. it must not necessarily be at the end of the charging phase, it instead possibly being at any other point in time precisely defined within the charging time interval which is easy to set e.g. by the clock of the control circuit.

In principle it is also irrelevant with which switch(es) the ON resistance of the circuit is set as long as in the first mode the pertinent switch is located in the charging path of the charge pump capacitors or as long as in the second mode the switches are each located in one of the paths for charging the first or second charge pump capacitor.

What is claimed is:

1. A DC/DC converter operating on the charge pump principle and regulated to a predetermined output voltage, including a first circuit array comprising a first charge pump capacitor, the one electrode of which is connectable via a first switch to the input of the converter and via a second switch to ground and the other electrode of which is connectable via a third switch to the input of the converter and via a fourth switch to the output of the converter;

a second circuit array configured the same as said first circuit array, in which the one electrode of its capacitor is connectable to the other electrode of the capacitor of said first circuit array via a further switch, all switches being controllable switches;

a control circuit capable of controlling the switches so that the charge pump is changed over between a charging phase and a discharge phase, and which is capable of operating the charge pump in two modes, whereby in the charging phase in the first mode the third switch of said second circuit array, the second switch of said first circuit array and the further switch and in the second mode each of the second and third switches of the two circuit arrays are ON, and in the discharge phase of the two modes the first and fourth switch each of the two circuit arrays is ON, whilst each other switch not mentioned is OFF;

a regulator circuit capable of setting when the charge pump is active in the charging phase in the first mode the ON resistance of a switch present in the charge path of the charge pump capacitors or in the second mode the ON resistance of two switches present each in one of the charging paths of the first or second charge pump capacitor so that the charging voltage presented to the charge pump capacitors in the charging phase assumes the minimum value possible for a specific input voltage of the converter;

a measuring circuit capable of determining the voltage occurring at one of the charge pump capacitors at a defined point in time of the charging phase; and a comparator capable of comparing the measured voltage to a predetermined voltage and then when the former attains the latter, changing over the charge pump into the corresponding other mode;

wherein said predetermined voltage is selected so that the efficiency of the converter is optimized and the charging condition of said charge pump capacitors is not altered on changeover.

2. The DC/DC converter as set forth in claim 1 wherein said measuring circuit comprises a sample-and-hold circuit capable of sampling the voltage applied to said charge pump capacitor during said charging phase and holding it at the end of said charging phase, said control circuit being capable of controlling said sample-and-hold circuit.

3. The DC/DC converter as set forth in claim 2 further comprising a second sample-and-hold circuit capable of sampling the voltage across the other charge pump capacitor during said charging phase and holding it at the end of said charging phase, and an averager connected to the outputs of both sample-and-hold circuits which is capable of forming the average value from said two capacitor voltages and applying it to said comparator which compares said average value to said predetermined voltage.

4. The DC/DC converter as set forth in claim 3 wherein said predetermined voltage substantially corresponds to half of the voltage momentarily applied to the input of said converter.

5. The DC/DC converter as set forth in claim 4 wherein said charge pump is continually active and said regulator circuit also handles regulation of the output voltage of said converter.

6. The DC/DC converter as set forth in claim 5 wherein said regulator circuit consists of a comparator receiving at one input the actual output voltage of said converter and at the other input a reference voltage representing the design output voltage.

7. The DC/DC converter as set forth in claim 4 further including a skip-mode regulator comprising a comparator which compares said actual output voltage to a reference voltage representing said design output voltage and outputs a first control signal to said control circuit when said actual output voltage drops below said design output voltage, said control circuit then activating said charge pump, and outputs a second control signal to said control circuit when said actual output voltage exceeds said design output voltage, said control circuit then deactivating said charge pump.

8. The DC/DC converter as set forth in claim 7 wherein said regulator circuit consists of a low-pass filter connected to said output of said comparator of said skip-mode regulator, said low-pass filter generating a signal characterizing the ratio between ON time and OFF time of said charge pump with which said ON resistance(s) of the corresponding switch(es) is/are controlled.

9. The DC/DC converter as set forth in claim 8 wherein a circuit is provided which sets said predetermined voltage as a function of the load current, it thereby making use of said output signal of said comparator of said skip-mode regulator as a measure for the level of said load current.

10. The DC/DC converter as set forth in claim 9 wherein all components of which, except for said charge pump capacitors, are fabricated integrated.

11. The DC/DC converter as set forth in claim 10, in which all switches are MOSFETs.

* * * * *